United States Patent [19]
Stritzke

[11] Patent Number: 5,267,740
[45] Date of Patent: Dec. 7, 1993

[54] METAL HEAD GASKET WITH INTEGRATED SEALING AIDS

[75] Inventor: Bernard G. Stritzke, Roselle, Ill.

[73] Assignee: Fel-Pro Incorporated, Skokie, Ill.

[21] Appl. No.: 839,338

[22] Filed: Feb. 20, 1992

[51] Int. Cl.⁵ .............................................. F16J 15/12
[52] U.S. Cl. ................................. 277/235 B; 277/166; 277/180; 277/207 R; 277/211; 277/235 R
[58] Field of Search ............. 277/235 B, 180, 166, 277/207 R, 209, 211, 235 R

[56] References Cited

U.S. PATENT DOCUMENTS

| | | | |
|---|---|---|---|
| 3,061,321 | 10/1962 | Smith | 277/180 |
| 3,170,701 | 2/1965 | Hoover | 277/225 |
| 3,215,442 | 11/1965 | Papenguth | 277/211 X |
| 3,342,501 | 9/1967 | Meyer | 277/180 |
| 3,462,116 | 8/1969 | Daubenberger et al. | 277/180 X |
| 3,473,813 | 10/1969 | Meyers et al. | 277/180 |
| 3,490,776 | 1/1970 | Avery | 277/180 |
| 3,531,133 | 9/1970 | Sheesley et al. | 277/209 X |
| 4,213,620 | 7/1980 | Kennedy et al. | 277/166 X |
| 4,817,969 | 4/1989 | McDowell et al. | 277/235 B |
| 4,856,796 | 8/1989 | Genin | 277/235 B |
| 5,033,189 | 7/1991 | Desverchere et al. | 277/235 B X |

FOREIGN PATENT DOCUMENTS

| | | | |
|---|---|---|---|
| 2831217 | 1/1980 | Fed. Rep. of Germany | 277/235 B |
| 3720838 | 1/1989 | Fed. Rep. of Germany | 277/235 B |
| 3903918 | 8/1990 | Fed. Rep. of Germany | 277/235 B |

OTHER PUBLICATIONS

Drawing A (No Date).
Drawing B (No Date).

Primary Examiner—William A. Cuchlinski, Jr
Assistant Examiner—James K. Folker

[57] ABSTRACT

A metal head gasket comprising a metal skeleton plate with fire rings in the combustion openings and elastomeric sealing beads around the fluid openings. The fire rings are integrated with the gasket via elastomeric bridges so that they float in the combustion openings and the fluid opening elastomeric seals are molded around those openings and embed struts and fill voids which at least partially surround the openings. The elastomeric bridges and seals are molded in situ and may all be molded with the metal plate in one operation.

6 Claims, 3 Drawing Sheets

METAL HEAD GASKET WITH INTEGRATED SEALING AIDS

BACKGROUND OF THE INVENTION

A variety of steel head gaskets having associated sealing aids are known to the art. Typically, head gaskets require both fire rings in the combustion openings and seals around various of the fluid openings. Such head gaskets frequently employ press-fit or staked in place fire rings, and inserted grommets. There is a risk, with such gaskets, that one or more of the sealing aids will be dislodged and that the gasket will be installed without such a sealing aid, in which event the engine in which the gasket is used could be damaged or destroyed.

A variety of suggestions have been made to overcome these possible problems and difficulties. For example, printed beads have been deposited on the gasket surfaces to provide seals around fluid openings. Suggestions for securing fire rings in combustion openings by an elastomeric bead which is molded around the peripheral edge of one metal layer to embed an edge of one layer of a multiple metal layer gasket have been proposed. Yet none of these suggestions has made available an integrated steel plate head gasket which has both a floating fire ring as well as effective fluid seals, or which produces a head gasket which effectively guarantees that all of the sealing aids will remain in place, regardless of rough handling, when the gasket is installed.

SUMMARY OF THE INVENTION

In accordance with the present invention, a head gasket which integrates all of its seals and sealing aids to guarantee its integrity when installed is provided.

The head gasket of the present invention comprises a metallic plate defining a plurality of combustion openings, each having a metallic fire ring disposed therein, each of which is spaced inwardly of its associated opening. The fire rings are suspended in the openings via formed in situ elastomeric bridges disposed between the combustion opening and an adjacent edge of the fire ring. The plate has sections integral with other portions of the plate and spaced from the other portions by widely spaced connecting struts. Substantial voids are defined between the struts. The sections defines a plurality of fluid openings, and formed in situ elastomeric sealing beads surrounding a plurality of the fluid openings and embedding the struts and filling the voids.

Desirably notches are provided in the plate adjacent the combustion openings which notches are filled with elastomer formed in situ with the elastomeric bridges and, in a preferred form, with the sealing beads as well.

Preferably the connecting struts are of a thickness reduced from the thickness of the plate and each sealing bead defines at least one, and preferably two, projections surrounding the fluid opening and projecting upwardly beyond the surface of the plate. At least some of the sealing beads may be spaced outwardly of the fluid openings and others may themselves define the fluid openings.

Further objects, features and advantages of the present invention will become apparent from the following description and drawings.

DETAILED DESCRIPTION OF THE DRAWINGS

Figure 2:
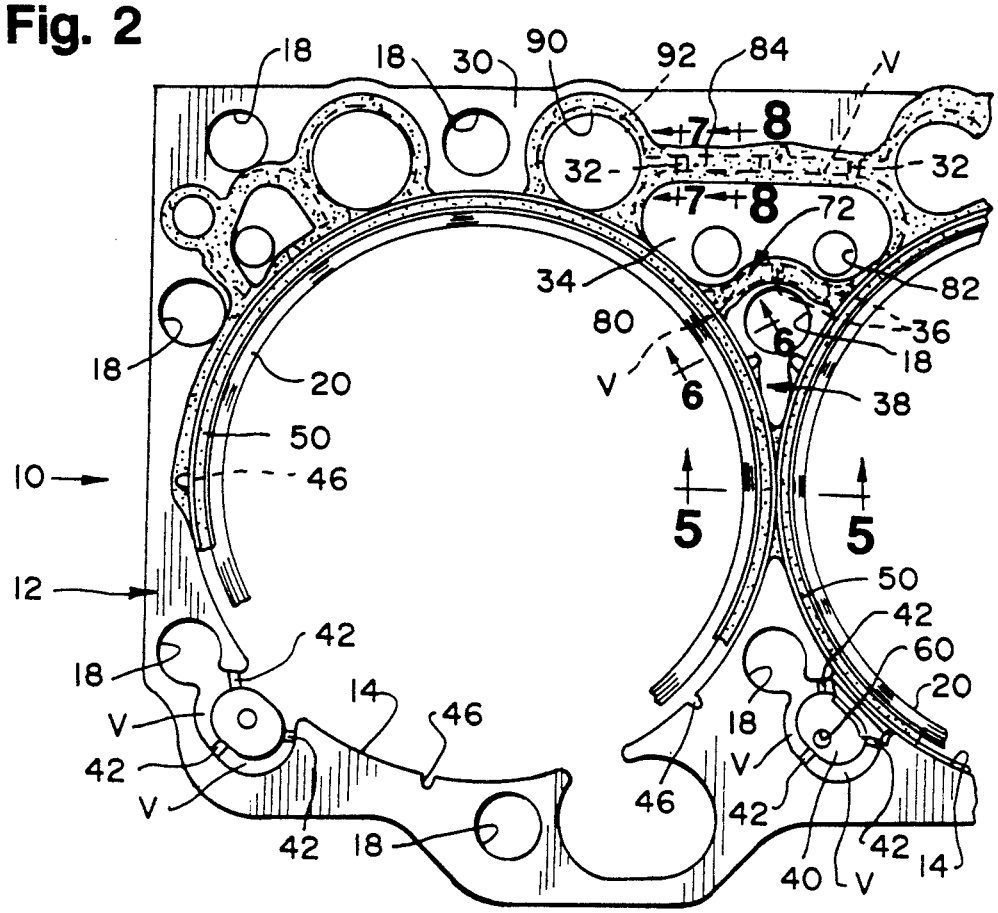
FIG. 2 is a fragmentary plan view of a section of the head gasket of FIG. 1, showing, in part, the skeleton metallic plate portion thereof.

Referring now to the drawings, a head gasket 10 made in accordance with the present invention has a main body comprising a single thickness metallic plate 12 having upper and lower main body surfaces. The metallic plate 12 may be of carbon steel about 0.080 inch thick. As best seen in FIG. 2, plate 12 is formed in a skeleton-like configuration to provide a plurality of combustion openings 14, a further plurality of fluid openings, and a plurality of bolt holes 18.

Figure 4:
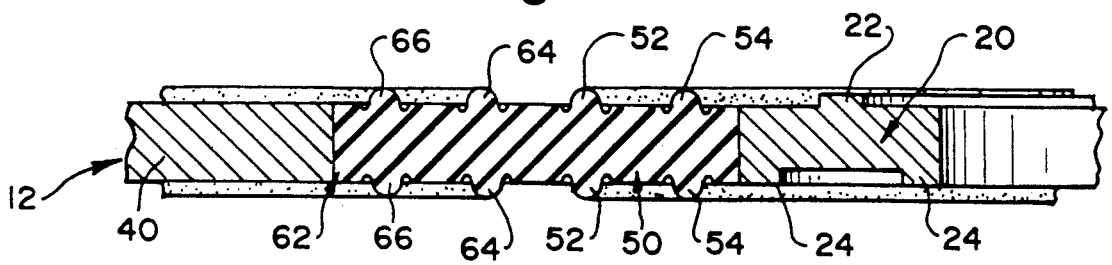
FIG. 4 is an enlarged cross-sectional view taken along line 4—4 of FIG. 3.
Figure 5:
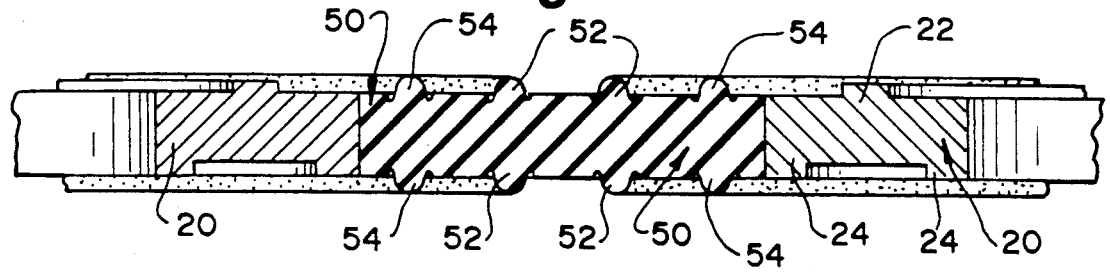
FIG. 5 is an enlarged cross-sectional view taken along line 5—5 of FIG. 2.
Figure 6:
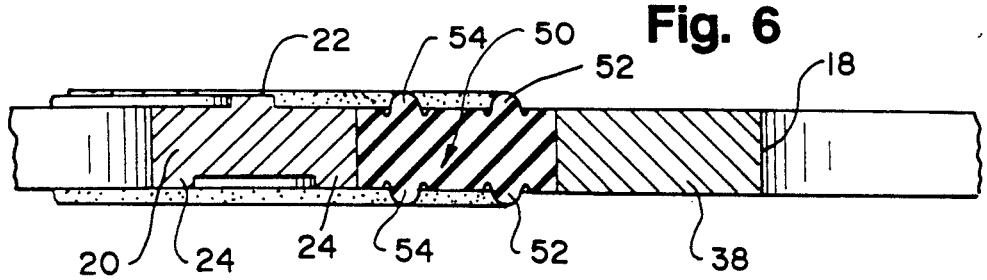
FIG. 6 is an enlarged cross-sectional view taken along line 6—6 of FIG. 2.

Each of the fluid openings and combustion openings is provided with a suitable appropriate sealing aid. To that end, each combustion opening 14 mounts a fire ring 20 (which may be of a conventional configuration) which is generally of the same shape in plan view as the associated combustion opening 14. The fire ring 20 is of approximately the same thickness as the plate 12, and may be embossed, as with an embossment, as best seen in FIGS. 4–6, which has a central elevated annular projection 22 on one side and a pair of annular feet 24 on the other side.

Each fire ring 20 is integrated with plate 12 and is supported in its opening 14 by an elastomeric bridge as will be described. Each fluid opening is provided with an encircling sealing bead. In some instances a sealing bead surrounds more than one opening and in other cases a fluid opening is provided with its own sealing bead.

As will best be seen in FIG. 2, the metallic plate 12 defines a plurality of sections which are connected to next adjacent sections via a plurality of widely spaced connecting struts. Thus, for example, plate 12 includes a main body section 30 which comprises the outer perimetric portion of the gasket plate 12. Section 30 is in turn connected, via connecting struts 32, to a further section 34 which in its turn is connected via connecting struts 36 to yet another section 38. Similarly another section 40 is connected via connecting struts 42 to body section 30. Other body sections are likewise so connected. As will best be seen in FIG. 2, the connecting struts are relatively narrow. They are reduced in thickness, as by coining, from the thickness of the plate 12, i.e., to perhaps 40% of that thickness, so that they do not significantly negatively affect the elastomeric sealing to be provided thereat or the operating characteristics of the sealing beads. The connecting struts are widely spaced from each other and define voids V therebetween. The skeleton also defines a plurality of notches 46.

Figure 1:
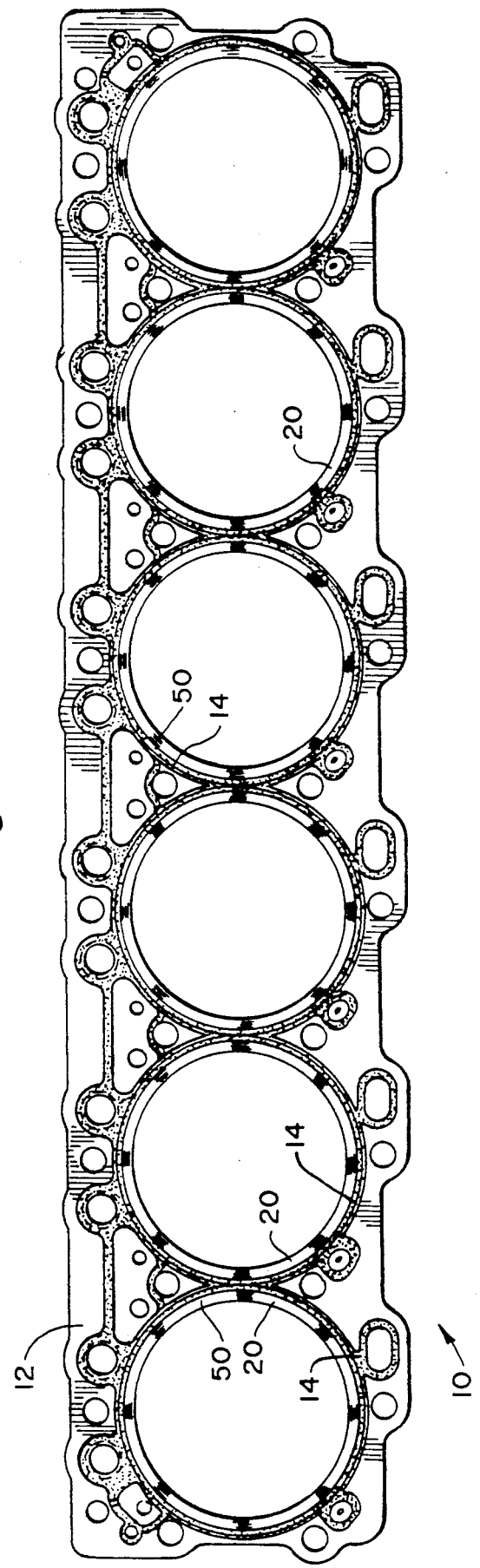
FIG. 1 is a plan view of a metallic head gasket in accordance with the present invention.
Figure 3:
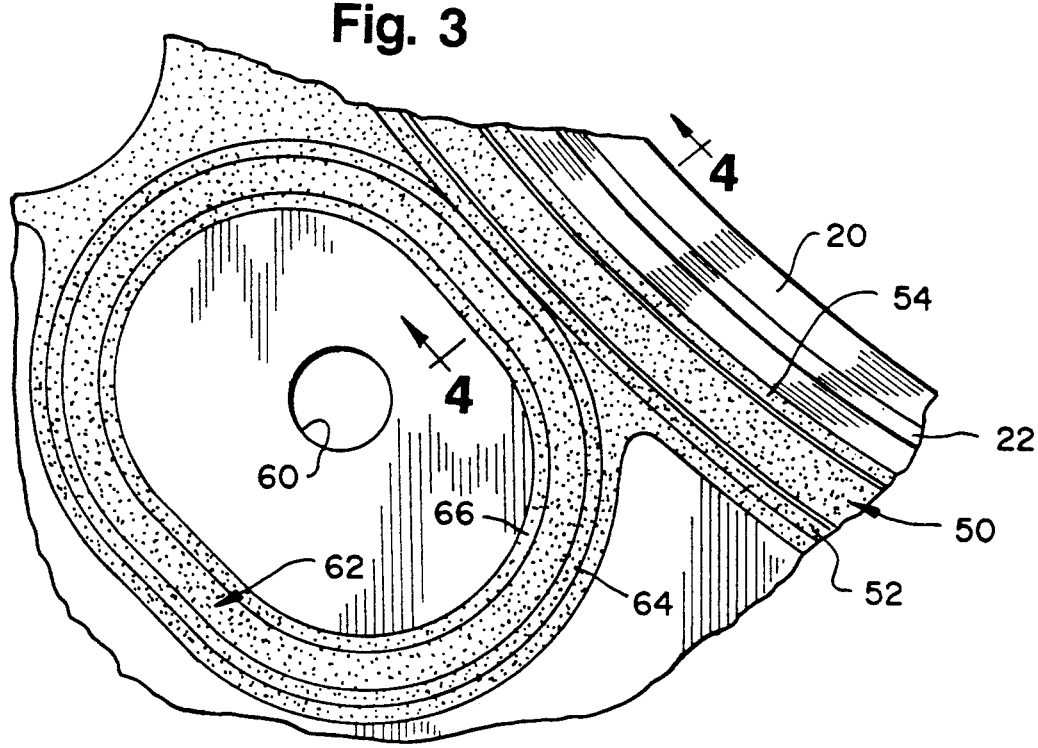
FIG. 3 is an enlarged fragmentary portion of FIG. 1.

Referring now to FIGS. 1, 2 and 3, it will be apparent that the just described skeleton configuration of the metallic plate 12 promotes integration of the fire rings and the sealing beads which are formed, as by an injection molding process, in situ therewith.

Thus, the fire rings 20 are supported in the combustion openings 14 by formed in situ elastomeric bridges 50. Bridges 50 are molded to the outer edges of the fire rings 20 and to the inner faces of the combustion openings 14. The main bodies of the bridges are preferably no greater in thickness than the metal plate 12 except in the zones of the pairs of spaced annular sealing projections 52, 54, as best seen in FIGS. 4–6. The bridges 50 permit the fire rings 20 to move vertically (to float) within their openings 14, thereby to accommodate sleeve stand-off and imperfections in the head and block structures, all without requiring any substantial portion of the clamping load for that purpose. The bridges 50 integrate the fire rings with the metallic plate and gasket assembly via the bonding of the elastomer to those parts. The notches 46 in the peripheral edges of the combustion openings serve as sprues for the rubber and may also serve to assist in providing a secure interlock of the elastomer of the bridges with the plate 12.

As will be seen in the drawings, each of the fluid openings is surrounded by an elastomeric sealing bead which is formed in situ. A typical suitable elastomer for the bridges and beads is silicone rubber. Others, such as nitrile rubber and fluoroelastomers may also be used.

Referring first to representative fluid opening 60 (FIGS. 2 and 3), this is seen to be surrounded by an elastomeric sealing bead 62. Sealing bead 62 is generally no thicker than the thickness of the plate, except in the zones of the pair of spaced annular sealing projections 64, 66. It will be apparent, in the case of sealing bead 62, that it embeds the associated connecting struts 42 and that in the zone facing the adjacent combustion opening it merges with and is formed with combustion opening bridge 50. It will also be apparent that bead 62 is spaced from opening 60 and fills the associated voids V.

Figure 7:
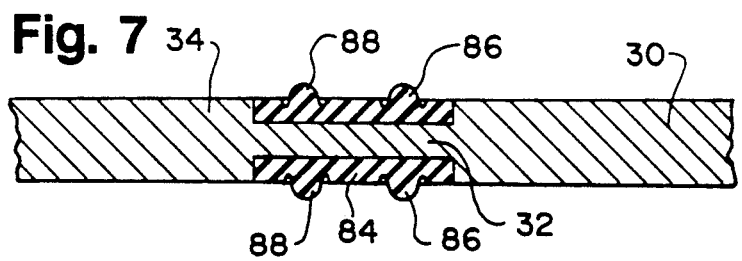
FIG. 7 is an enlarged cross-sectional view taken along line 7—7 of FIG. 2.
Figure 8:
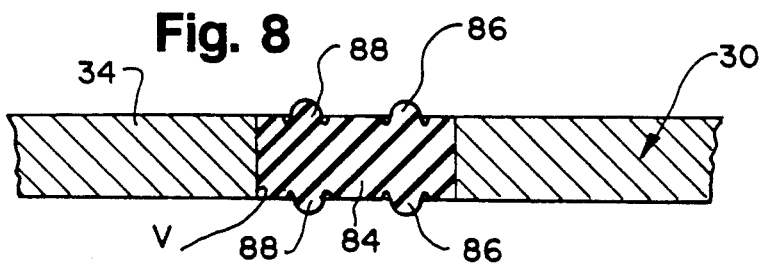
FIG. 8 is an enlarged cross-sectional view taken along line 8—8 of FIG. 2.

Similarly, fluid openings 80, 82 are surrounded by a sealing bead which, in this instance, comprises a bead segment 84 which has sealing projections 86, 88 (FIGS. 7 and 8) and adjacent portions of elastomeric bridges 50 and a sealing bead segment 72. Sealing bead 72 has sealing projections like those of bridges 50, and fills the associated voids V between the associated connecting struts 36. Here again the sealing bead is spaced from the fluid openings 80, 82 and the bead material fills the associated voids V and embeds struts 32. FIGS. 7 and 8 are representative views of the connecting struts and voids and sealing beads and configurations at the other zones in which the struts are shown and used.

In the case of opening 90, the sealing bead 92 is disposed within and forms the inner perimeter of the opening 90 itself and merges with bead segment 84 and bridge 50 to form the annular seal. Sealing bead 92 also provides sealing projections like those of the other sealing beads and of bridge 50.

Not only is the head gasket 10 with the formed in situ sealing beads and elastomeric bridges protected against inadvertent loss of the sealing aids, but the mounting of the fire rings in the manner described minimizes loss of the clamping load. Further, the design exhibits more highly effective, and more consistent, sealing around the fluid openings than do conventional seals, in part because over compression of rubber at the openings, such as coolant metering openings as represented by opening 60, can be avoided by appropriate shaping and sizing of the molded rubber sealing beads. Further, the gasket has a more stable compressed thickness and more consistent combustion sealing loading, and exhibits less torque loss. Additionally, the integration of the parts and molding of the sealing beads takes place in a single operation, making manufacture less expensive and providing for greater consistency in the gaskets produced.

From the foregoing it will be apparent to those skilled in the art that modifications may be made without departing from the spirit and scope of the present invention. Accordingly, the invention is not intended to be limited except as may be made necessary by the appended claims.

What is claimed is:

1. A head gasket comprising a metallic plate of a first thickness having a skeleton-like configuration and defining a plurality of combustion openings, adjacent pairs of which intersect, each said combustion opening having a metallic fire ring disposed therein and spaced inwardly of its opening, each said fire ring being suspended in the opening via a formed in situ elastomeric bridge disposed between the combustion opening and an adjacent edge of the fire ring, with adjacent elastomeric bridges being integrally formed, said plate having sections integral with other portions of the plate and spaced from said other portions and connected with said other portions by widely spaced, narrow connecting struts of a thickness reduced from said first thickness and defining substantial voids between the struts, said sections defining a plurality of fluid openings, and formed in situ elastomeric sealing beads surrounding a plurality of said fluid openings and embedding said struts and filling said voids, at least some of said sealing beads being integrally formed with said elastomeric bridges, all to form an integrated elastomeric sealing system for said head gasket.

2. A head gasket in accordance with claim 1, and wherein notches are disposed in said plate adjacent said combustion openings and are filled with elastomer formed in situ with said elastomeric bridges and with said sealing beads.

3. A head gasket in accordance with claim 1, and wherein each said sealing bead defines at least one projection surrounding a fluid opening and projecting upwardly beyond the surface of the plate.

4. A head gasket in accordance with claim 3, and wherein each said sealing bead defines at least two projections surrounding a fluid opening, at least one of said projections projecting outwardly beyond each surface of the plate.

5. A head gasket in accordance with claim 1, and wherein at least some of said sealing beads are spaced outwardly of the fluid openings.

6. A head gasket in accordance with claim 5, and wherein at least some of said sealing beads define the fluid opening.

* * * * *